United States Patent
Kampf

[11] Patent Number: 5,743,498
[45] Date of Patent: Apr. 28, 1998

[54] PIPE ANCHORING SYSTEM

[75] Inventor: Mark Kampf, Crystal Lake, Ill.

[73] Assignee: Ireco, Inc., Chicago, Ill.

[21] Appl. No.: 797,981

[22] Filed: Feb. 12, 1997

[51] Int. Cl.$^6$ .................................................. E21F 17/02
[52] U.S. Cl. ............................................ 248/74.4; 248/62
[58] Field of Search ............................. 248/74.4, 74.1, 248/62, 56, 61, 58

[56] References Cited

U.S. PATENT DOCUMENTS

| | | |
|---|---|---|
| 2,546,792 | 3/1951 | Smith et al. . |
| 2,625,354 | 1/1953 | Smith . |
| 4,102,524 | 7/1978 | Cseri ............................. 248/56 |
| 4,222,538 | 9/1980 | Jensen et al. . |
| 5,370,344 | 12/1994 | Nadherny . |
| 5,395,079 | 3/1995 | Jensen et al. . |
| 5,472,158 | 12/1995 | Nadherny ........................ 248/56 |
| 5,605,309 | 2/1997 | Nadherny .................... 248/74.4 X |
| 5,624,089 | 4/1997 | Nadherny et al. ............. 248/74.4 X |

Primary Examiner—Ramon O. Ramirez
Assistant Examiner—Long Dinh Phan
Attorney, Agent, or Firm—Lockwood, Alex, FitzGibbon & Cummings

[57] ABSTRACT

A system for anchoring a pipe, such as a train pipe, to the inside of an elongated right angle structural part or member, such as may be mounted on a sidewall of a rail car. The elongated right angle structural part has a plurality of spaced bolt receiving holes extending through one leg and a plurality of pipe anchor bases, with brackets fastened thereto, are attached to the right angle structural member by means of a single bolt extending through a bracket and one of the spaced bolt-receiving holes. Each pipe anchor base may be of the general type found in known pipe anchors as disclosed, for example, in U.S. Pat. No. 2,546,792 dated Mar. 27, 1951, U.S. Pat. No. 2,625,354 dated Jan. 13, 1953 and U.S. Pat. No. 4,222,538 dated Sep. 16, 1980. Once a combined pipe anchor base and its bracket has been installed on the inside of the right angle structural part, relative movement between the anchor base-bracket combination and the structural part will be prevented. Each bracket will have a pair of openings, one of which will be exposed and the other will be covered or blinded when the bracket is secured to an anchor base in one position and this relationship will be reversed when the bracket is secured in a different position on the bracket. Thus, the anchor base-bracket combinations can be left-handed or right-handed.

13 Claims, 2 Drawing Sheets

PIPE ANCHORING SYSTEM

BACKGROUND AND DESCRIPTION OF THE INVENTION

This invention relates, generally, to a system for anchoring a pipe or other similar elongated object to the inside of a right angle structural part, preferably in such manner that the pipe anchors and pipe anchored thereto do not extend transversely beyond the right angle structural part. The invention relates more particularly to railway cars having sidewalls which have side sills having right angle structural formations extending along a sidewall and a system of pipe anchors secured to the inside of the elongated right angle structural formations with no parts of the pipe anchors extending inwardly from a rail car sidewall appreciably beyond the extent to which a right angle structural formation extends inwardly.

The pipe anchors themselves are of generally known type and comprise an anchor base and mating wedge clamp. Such pipe anchors are disclosed in U.S. Pat. No. 2,546,792 dated Mar. 27, 1951, U.S. Pat. No. 2,625,354 dated Jan. 13, 1953 and U.S. Pat. No. 4,222,538 dated Sep. 16, 1980.

Each pipe anchor of the system comprises a pipe anchor base to which is fastened a bracket by means of which each pipe anchor base can be mounted by a single bolt to the inside of the right angle structural formation. One portion of each bracket has a bolt receiving opening which can be aligned with a bolt hole in one leg of the right angle structural formation whereby a single bolt will suffice to attach each bracket and its attached anchor base in a manner which prevents any appreciable relative movement between the anchor base and the right angle structural formation or part.

The object of the invention, generally stated, is the provision of a system for anchoring a pipe or other similar elongated object within a right angle structural part or formation at spaced locations therealong in such a manner that only a single bolt is used at each location to secure a pipe anchor to the right angle structural formation with relative movement between a pipe anchor and the right angle structural part being prevented.

A further object of the invention is to provide such a system which utilizes known type pipe anchor bases and wedge clamps with attaching brackets permanently fastened to each anchor base so as to provide a ready-made combined part which may be readily installed at each desired location by use of a single bolt, preferably, a Huck-type bolt.

Another object is to provide such ready-made combined parts which can be made right-handed or left-handed from the same components so that the pipe anchor wedge clamps can be driven from opposite directions with respect to the anchored pipe.

For a more complete understanding of the nature and scope of the invention, reference may now be had to the following detailed description taken in conjunction with the accompanying drawings, wherein:

BRIEF DESCRIPTION OF THE DRAWINGS

FIG. 10 is an elevational view corresponding to FIG. 7 but with the pipe anchor base-bracket combination being shown for a left-hand mount whereas FIG. 7 shows the combination for a right-hand mount;

Referring to FIG. 1, a structural member is indicated generally at 5 which, in practice, may be the side sill of a railway car. At its base, the side sill 5 has a right angle structural formation indicated generally at 6 consisting of the horizontal leg 7 and an integrally depending vertical leg or flange 8. The right angle structural part or formation 6 is elongated and is adapted to serve as a support or hanger for a pipe 10 which, in the case of a railway car, can be a train pipe. It is desirable and advantageous in the construction of a railway car that the train pipe 10 and the means for supporting it be located laterally within the confines of the right angle structural formation 6 as shown in FIG. 1.

Figure 7:
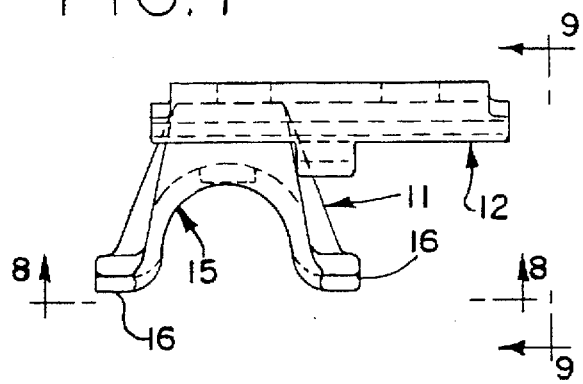
FIG. 7 is a side elevational view of the pipe anchor base and bracket combination of FIG. 1.

The support for the train pipe 10 is provided by the combination of a pipe anchor of known type indicated in its entirety generally at 11 to which a support bracket indicated generally at 12 is permanently fastened. The pipe anchor 11 consists of an anchor base 13 and an interengaging wedge clamp 14, both of known type. The anchor base 13 has a longitudinally extending pipe receiving saddle portion 15 (FIG. 7) in the interior of which the longitudinally extending pipe 10 may be seated and clamped by the wedge clamp 14. The size of the interior of the saddle portion will correspond to the size of the pipe of the pipe 10. The anchor base 13 also has a pair of longitudinally extending wedge clamp-receiving and retaining flanges 16—16 projecting laterally on opposite sides of the saddle portion. The wedge clamp 14 mates with the flanges 16 in known manner so as to clamp the pipe 10 firmly within the pipe anchor 11.

Figure 1:
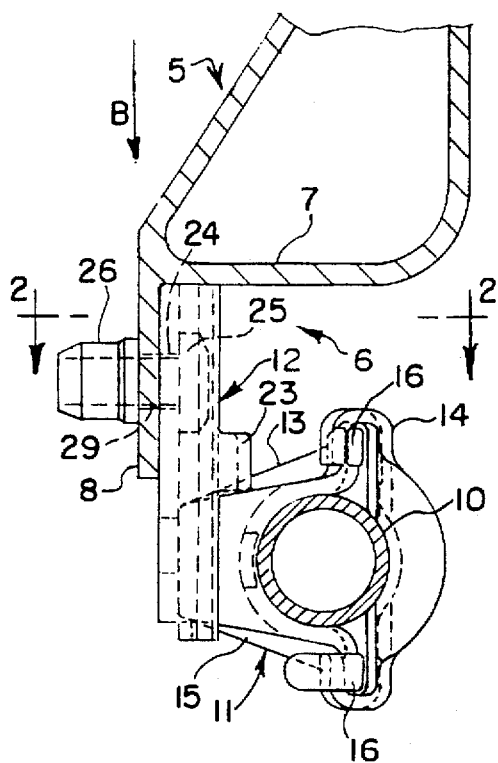
FIG. 1 is an end view showing in fragmentary vertical cross-section an elongated structural part in the form of a railway car side sill having a right angle structural formation at the bottom within which a combined pipe anchor and bracket, forming an embodiment of this invention and show in end elevation, is bolted.
Figure 2:
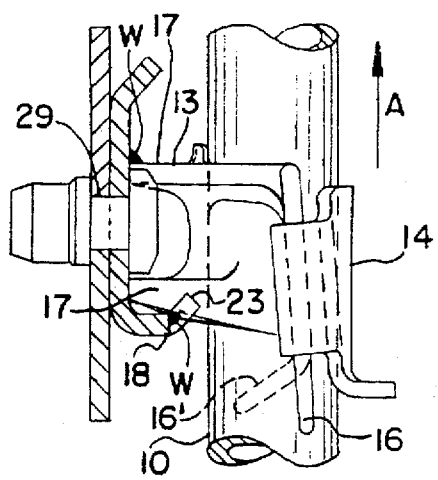
FIG. 2 is a partly sectional and partly plan view taken on line 2—2 of FIG. 1.
Figure 8:
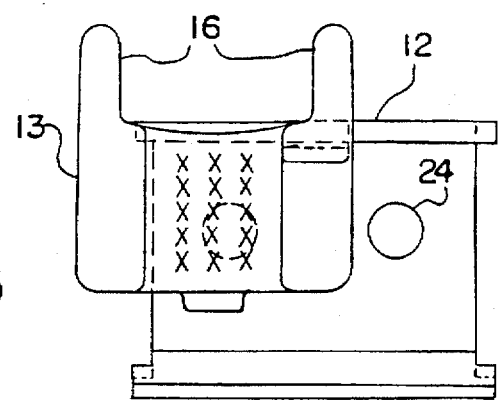
FIG. 8 is a view of the combination shown in FIG. 7 taken on line 8—8 of FIG. 7.
Figure 9:
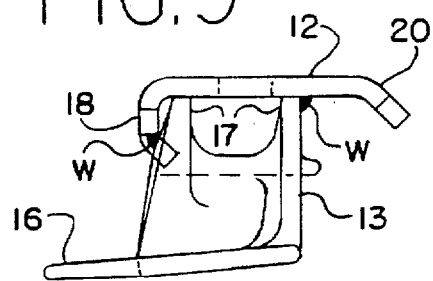
FIG. 9 is an end elevational view taken on line 9—9 of FIG. 7.

The anchor base 13 also has a pair of spaced upstanding parallel flanges or ears 17 (FIGS. 2 and 9) on its saddle portion 15 to which the bracket 12 is permanently fastened as by longitudinal welds W—W (FIGS. 2 and 9). In the embodiment of the anchor base 13 shown in FIGS. 1, 2 and 7–9, the bracket support flanges 17 extend transversely to the wedge clamp and pipe retaining flanges 16. In other anchor bases the bracket support flanges 17 extend parallel to the flanges 16. In both embodiments the support bracket 12 will sit on the tops of the flanges and be welded thereto.

The bracket 12 is generally in the shape of a rectangular plate having a locator flange 18 extending along one side, bent so as to extend at approximately 90° to the main flat portion of the bracket. The opposing edge 20 of the bracket 12 is bent at an angle to the flat portion so as to reinforce the bracket 12. The opposite ends of the locator flange 18 are provided with tabs 21—21 and the opposite ends of the reinforcing flange 20 likewise have tabs 22—22 on its opposite ends. Midway between its opposite ends the locator flange 18 has an inturned integrally formed bracket locator tab 23 which cooperates with the locator flange 18 in accurately locating the bracket 12 on the anchor base 13 for welding.

The bracket 12 preferably has a pair of longitudinally aligned bolt-receiving holes 24—24, one of which is exposed so as to receive the shank of a bolt 25 (FIG. 1) which projects through a registering hole 29 in the leg 8 so as to attach the bracket 12 thereto.

The locations of the holes 24 are such that when the bolt 24 passes through one of these holes and a registering hole 29 in the leg 8, the adjacent pair of tabs 21 and 22 will engage the underside of the leg 7. With the bolt 25 being drawn up tight it will be seen that the bracket 12 is securely held in place and cannot rotate in either direction around the bolt 25 by reason of the engagement of the tabs 21 and 22 with the leg 7 of the right angle structural formation 6. A preferred form of the bolt 25 is a Huck-bolt which is shown in FIG. 1 installed with the usual swedged collar 26. Huck bolts can be readily installed and can be drawn up tight so as to prevent movement of the bracket 12 with respect to the side sill 5.

It will be understood that in a typical installation, a series of the anchor base-bracket combinations will be bolted to the inside of the vertical flange 8 after which the pipe 10 can be put in place in the saddle portions 15 (FIGS. 1 and 7) of the anchor bases 15 and secured firmly in place therein by driving each mating wedge clamp 14 "home" in the usual manner. Once a wedge clamp has been driven home, one of the tabs on an end of a flange 16 will be bent up as indicated at 16' in FIG. 2 so as to retain the assembly in firmly clamped condition.

With a bracket 12 welded to an anchor base 13 as shown in FIGS. 1, 2, 7–9, one of the bolt receiving holes 24 is located free and clear of the anchor base 13 while the other hole 24 is blinded by the anchor base. By shifting the bracket 12 as shown in FIG. 8 so that the hole 24 that is free and clear in FIG. 8 will be blinded in FIG. 8 by the anchor base 13, and the hole 24 that is blinded in FIG. 8 will be free, and clear of the anchor base 13, the flanges 16 will extend in the opposite direction when the bracket 12 is mounted on the leg 8. Thus, the anchor base-bracket combinations can be made right-handed and left-handed from the same parts so that upon installation some of the wedge clamps 14 will be driven from one direction while the others will be driven from opposite directions. This option is a desirable feature in elongated installations so that longitudinal shifting of the pipe 10 is equally resisted in both directions.

Figure 10:
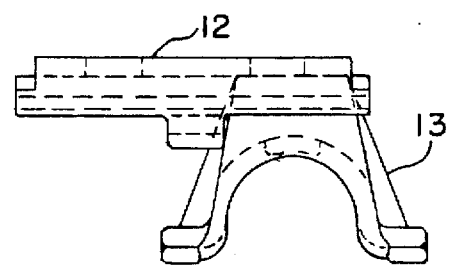
Figure 11:
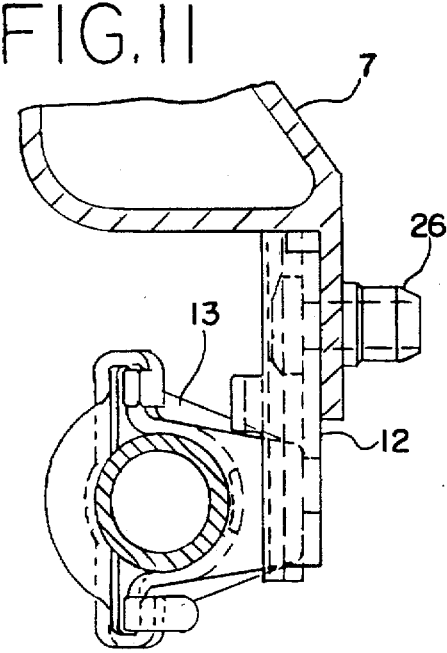
FIG. 11 is a fragmentary view similar to FIG. 1 showing the left-hand mount relationship.

The locator flange 18 and locator tab 23 on each bracket 12 serve to readily and accurately locate each bracket 12 with respect to each anchor base 13. As shown in FIG. 2, the interior of the locator flange 18 engages the anchor base 13 so as to locate the bracket 12 in one direction with respect to the anchor base as indicated by the arrow A (FIG. 2) while one side edge of the locator tab 23 engages the anchor base 13 as shown in FIG. 1 so as to locate the bracket 12 at a right angle to the first mentioned direction as indicated by arrow B (FIG. 1). It will be understood that when the bracket 12 is assembled or fastened to an anchor base 13 so as to project from the anchor base 13 in the opposite direction, the other side edge of the locator tab 12 will engage the opposite side of the anchor base 13. This alternate arrangement between the anchor base 11 and bracket 12 is shown in FIGS. 10 and 11.

In production, desired quantities of bracket-anchor base combinations will be assembled by welding brackets 12 to anchor bases 13. As mentioned above, a desired portion of the combinations will be assembled so as to be right-handed while another portion will be assembled so as to be left-handed. In both cases, assembly is facilitated by relying on the locator flanges 18 and locator tabs 23 for accurately positioning the brackets with respect to the anchor bases 13 for welding. Once a bracket 12 and an anchor base 13 have been assembled relying on the locator flange 18 and locator tab 23, they will be temporarily clamped together until they are permanently welded together as indicated at W—W in FIGS. 2 and 9.

In installing pipe anchor systems, the brackets 12 of the bracket-anchor base combinations or units will be bolted to an elongated flange 8 of a structural member such as a railway car side sill 5. A portion of the combinations installed will be left-handed and a portion (preferably an equal portion) will be right-handed. A pipe to be anchored, such as a train pipe 10, will be inserted in place and wedge clamps 14 will be mated with the anchor bases 13 and driven "home". The wedge clamps 14 will be driven in opposite directions depending on whether they are mated to right-handed or left-handed bracket-anchor base combinations.

Figure 3:
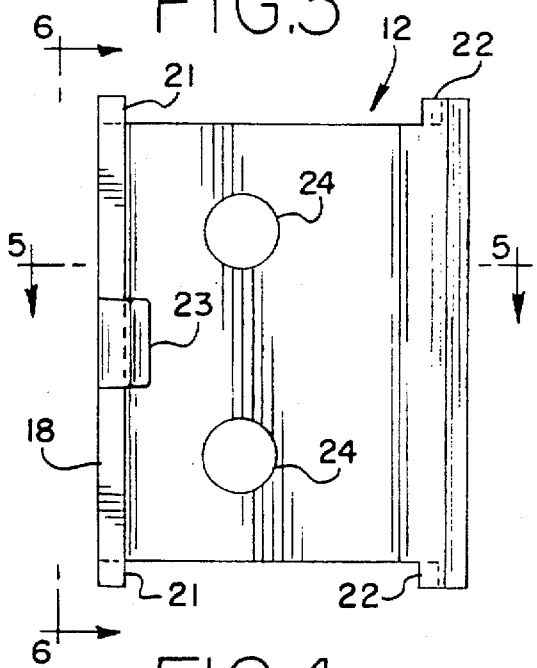
FIG. 3 is a somewhat enlarged elevational view of an upright bracket forming part of the pipe anchor and bracket combination shown in FIGS. 1 and 2.
Figure 6:
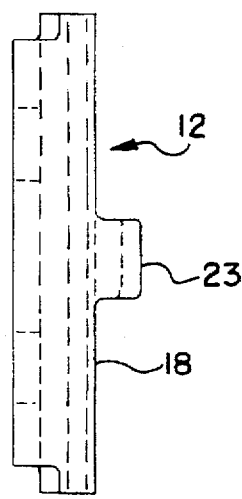
FIG. 6 is a side elevational view taken on line 6—6 of FIG. 3.
Figure 4:
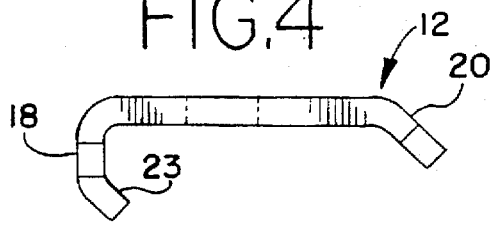
FIG. 4 is an end view of the bracket shown in FIG. 3.
Figure 5:
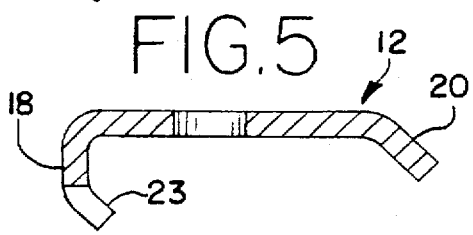
FIG. 5 is a sectional view taken on line 5—5 of FIG. 3.
Figure 12:
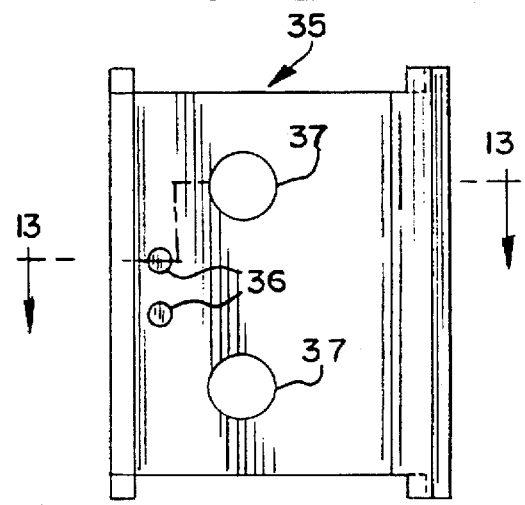
FIG. 12 is a view corresponding to FIG. 3 showing a modificaton of the bracket shown in FIG. 3.
Figure 13:
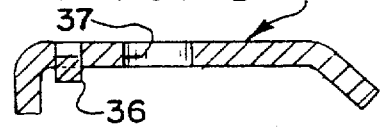
FIG. 13 is a sectional view taken on line 13—13 of FIG. 12.

A modification of the bracket 12 of FIGS. 3–5 is indicated generally at 35 in FIGS. 12 and 13. The bracket 35 corresponds to the bracket 12 except that the locator tab 23 has been eliminated and replaced with two detents 36—36. The detents can be formed in the material when the bracket 35 is stamped out in production. Elimination of the locator tab 23 results in a saving in material cost since there will be less scrap. In assembling a bracket 35 and an anchor base 13, the anchor base will be brought into engagement with one or the other of the detents 36 depending on which of the holes 37—37 in the bracket 35 is to be left fully exposed. With the two parts temporarily clamped together by a suitable clamping tool they will be permanently secured together by welding.

What is claimed is:

1. In combination, a pipe anchor base and fastened thereto a bracket for mounting the pipe anchor base to a right angle structural part within two legs thereof one of which has a bolt receiving hole extending therethrough, said pipe anchor base comprising a longitudinally extending pipe receiving saddle portion having an interior in which a longitudinally extending pipe may be seated and clamped by means of a mating wedge clamp, a pair of spaced, upstanding and parallel flanges adjacent opposite sides or ends of said saddle portion, and longitudinally extending wedge clamp receiving and retaining flanges projecting laterally on opposite sides of said saddle portion, and said bracket being in the form of a flat generally rectangular plate having an integral locator flange extending along one side thereof for aligning said bracket and said anchor base together in a first direction and having two-sided locator means for aligning said bracket and said anchor base together in a second direction at a right angle to said first direction, said bracket having a pair of spaced bolt-receiving holes therein longitudinally aligned at a right angle to said saddle portion of said pipe anchor base, said bracket being welded to said pair of upstanding flanges on said anchor base with the inner side of said locator flange either abutting one pair of the longitudinal ends of said flanges on said anchor base or abutting the outer side of one of said flanges in said first direction, with one side edge of said two-sided locator means engaging one side of said anchor base in said second direction and with one of said bolt receiving holes being located free and clear of said anchor base so as to be registerable with said bolt receiving hole in one leg of said right angle structural part when said bracket is placed flatwise against the inside of said leg, and said bracket prior to being welded to said pair of upstanding flanges on said anchor base being weldable to said anchor base in an alternate orientation in which the other side of said two-sided locator means engages said anchor base whereby the other of said bolt receiving holes is free and clear of said anchor base.

2. The combination pipe anchor base and bracket called for in claim 1, wherein a pair of transversely spaced tabs project longitudinally from each end of said bracket for engaging the other leg of said right angle structural part and preventing rotation of said bracket in the plane of said flat rectangular plate.

3. The combination pipe anchor base and bracket called for in claim 1, wherein said two-sided locator means is in the form of a pair of detents integrally formed in said bracket in parallel alignment with said locator flange and equally spaced on opposite sides of the longitudinal mid-point of said locator flange.

4. The combination pipe anchor base and bracket called for in claim 3, wherein a pair of transversely spaced tabs project longitudinally from each end of said bracket for engaging the other leg of said right angle structural part and preventing rotation of said bracket in the plane of said flat rectangular plate.

5. In combination, a pipe anchor base and fastened thereto a bracket for mounting the pipe anchor base to a right angle structural part within the two legs thereof one of which has a bolt receiving hole extending therethrough, said pipe anchor base comprising a longitudinally extending pipe receiving saddle portion having an interior in which a longitudinally extending pipe may be seated and clamped by means of a mating wedge clamp, a pair of spaced, upstanding and parallel flanges adjacent opposite sides or ends of said saddle portion, and longitudinally extending wedge clamp receiving and retaining flanges projecting laterally on opposite sides of said saddle portion, and said bracket being in the form of a flat generally rectangular plate having an integral locator flange extending along one side thereof with an inturned bracket locator tab integrally extending from the middle of the distal longitudinal edge thereof, said bracket having a pair of spaced bolt-receiving holes therein longitudinally aligned at a right angle to said saddle portion of said pipe anchor base, said bracket being welded to said pair of upstanding flanges on said anchor base with the inner side of said locator flange either abutting one pair of the longitudinal ends of said flanges on said anchor base or abutting the outer side of one of said flanges in a first direction, with one longitudinal side edge of said locator tab engaging one side of said anchor base in a second direction at a right angle to said first direction and with one of said bolt receiving holes being located free and clear of said anchor base so as to be registerable with said bolt receiving hole in one leg of said right angle structural part when said bracket is placed flatwise against the inside of said leg, and said bracket prior to being welded to said pair of upstanding flanges on said anchor base being weldable to said anchor base in an alternate orientation in which the other longitudinal side edge of said locator tab engages said anchor base whereby the other of said bolt receiving holes is free and clear of said anchor base.

6. The combination pipe anchor base and bracket called for in claim 5, wherein a pair of transversely spaced tabs project longitudinally from each end of said bracket for engaging the other leg of said right angle structural part and preventing rotation of said bracket in the plane of said flat rectangular plate.

7. A system for anchoring a pipe to an elongated right angle structural part within two legs thereof one of which has a plurality of aligned longitudinally spaced bolt-receiving holes extending therethrough comprising, a plurality of pipe anchors each having a pipe anchor base to which is fastened a bracket for mounting each pipe anchor base to the inside of said right angle structural part at one of said bolt-receiving holes therein, each said pipe anchor base comprising a longitudinally extending pipe-receiving saddle portion having an interior in which a longitudinally extending pipe may be seated and clamped by means of an interengaging wedge clamp forming a component of each said pipe anchor, a pair of spaced upstanding parallel flanges adjacent opposite sides or ends of said saddle portion, and longitudinally extending wedge clamp-receiving and retaining flanges projecting laterally on opposite sides of said saddle portion for mating with each said wedge clamp, and each said bracket being in the form of a flat generally rectangular plate having an integral locator flange extending along one side thereof for aligning said bracket and said anchor base together in a first direction and having two-sided locator means for aligning said bracket and said anchor base together in a second direction at a right angle to said first direction, said bracket having a pair of spaced bolt-receiving holes therein longitudinally aligned at a right angle to said saddle portion of said pipe anchor base, each said bracket being welded to said pair of flanges on a said anchor base with the inner side of that locator flange either abutting one pair of the longitudinal ends of said flanges on said anchor base or abutting the outer side of one of said flanges in said first direction, with one side of said two-sided locator means engaging one side of said anchor base in said second direction and with one of said bolt receiving holes being located free and clear of said anchor base so as to be registerable with a said bolt receiving hole in one leg of said right angle structural part when said bracket is placed flatwise against the inside of said leg, and each said bracket prior to being welded to said pair of upstanding flanges on said anchor base being weldable to said anchor base in an alternate orientation in which the other side of said two-sided locator means engages said anchor base whereby the other of said bolt receiving holes is free and clear of said anchor base.

8. The system called for in claim 7, wherein each said bracket has a pair of transversely spaced tabs projecting from each end thereof for engaging the other leg of said right angle structural part and preventing rotation of the bracket in the plane of said flat rectangular plate.

9. The system called for in claim 7, wherein said two-sided locator means is in the form of a pair of detents integrally formed in said bracket in parallel alignment with said locator flange and equally spaced on opposite sides of the longitudinal mid-point of said locator flange.

10. The system called for in claim 9, wherein each said bracket has a pair of transversely spaced tabs projecting from each end thereof for engaging the other leg of said right angle structural part and preventing rotation of the bracket in the plane of said flat rectangular plate.

11. The system called for in claim 7, wherein a portion of said plurality of said pipe anchor and bracket combinations are installed with said longitudinally extending wedge clamp-receiving and retain flanges thereon projecting in one direction and the remainder projecting in the opposite direction.

12. A system for anchoring a pipe to an elongated right angle structural part within two legs thereof one of which has a plurality of longitudinally spaced bolt-receiving holes extending therethrough comprising, a plurality of pipe anchors each having a pipe anchor base to which is fastened a bracket for mounting each pipe anchor base to the inside of said right angle structural part at one of said bolt-receiving holes therein, each said pipe anchor base comprising a longitudinally extending pipe-receiving saddle portion having an interior in which a longitudinally extending pipe may be seated and clamped by means of an interengaging wedge clamp forming a component of each said pipe anchor, a pair of spaced upstanding parallel flanges adjacent opposite sides or ends of said saddle portion, and longitudinally extending wedge clamp-receiving and retaining flanges projecting laterally on opposite sides of said saddle portion for mating with each said wedge clamp, and each said bracket being in the form of a flat generally rectangular plate having an integral locator flange extending along one side thereof with an inturned bracket locator tab integrally extending from the middle of the distal longitudinal edge thereof, said bracket having a pair of spaced bolt-receiving holes therein longitudinally aligned at a right angle to said saddle portion of said pipe anchor base, each said bracket being welded to said pair of flanges on a said anchor base with the inner side of that locator flange either abutting one pair of the longitudinal ends of said flanges on said anchor base or abutting the outer side of one of said flanges in a first direction, with one longitudinal side edge of said locator tab engaging one side of said anchor base in a second direction at a right angle to said first direction and with one of said bolt receiving holes being located free and clear of said anchor base so as to be registerable with a said bolt receiving hole in one leg of said right angle structural part when said bracket is placed flatwise against the inside of said leg, and each said bracket prior to being welded to said pair of upstanding flanges on said anchor base being weldable to a said anchor base in an alternate orientation in which the other longitudinal side edge of said locator tab engages said anchor base whereby the other of said bolt receiving holes is free and clear of said anchor base.

13. The system called for in claim 12, wherein each said bracket has a pair of transversely spaced tabs projecting from each end thereof for engaging the other leg of said right angle structural part and preventing rotation of the bracket in the plane of said flat rectangular plate.

* * * * *